United States Patent [19]
Tabain

[11] Patent Number: 5,692,437
[45] Date of Patent: Dec. 2, 1997

[54] PORTABLE BEARING PRESS

[76] Inventor: Geoffrey Tabain, 6 Alanbrae Place, Devonport, Tasmania 7310, Australia

[21] Appl. No.: 540,967

[22] Filed: Oct. 11, 1995

[30] Foreign Application Priority Data

Oct. 11, 1994 [AU] Australia ................. PM8822

[51] Int. Cl.⁶ ............... B30B 1/20; B30B 15/04
[52] U.S. Cl. ............... 100/231; 29/251; 72/454; 100/289
[58] Field of Search ............... 100/231, 289; 29/251, 257; 72/454

[56] References Cited

U.S. PATENT DOCUMENTS

| | | | |
|---|---|---|---|
| 193,330 | 7/1877 | Hall et al. ............... | 100/289 |
| 773,912 | 11/1904 | Bartlett ............... | 29/251 |
| 829,488 | 8/1906 | Ridderhof ............... | 100/289 |
| 918,351 | 4/1909 | Moe ............... | 72/454 |
| 1,373,427 | 4/1921 | Houser ............... | 72/454 |
| 1,618,879 | 2/1927 | James ............... | 100/289 |

*Primary Examiner*—Stephen F. Gerrity
*Attorney, Agent, or Firm*—Dennison, Meserole, Pollack & Scheiner

[57] ABSTRACT

A portable bearing press for locating a component, such as a bearing, onto a shaft, or for separating the bearing from a shaft comprising an L-shaped support frame which can be mounted and held between the jaws of a vice, an object supporting component mounted on the support frame and a device for applying pressure to a portion of the component.

6 Claims, 4 Drawing Sheets

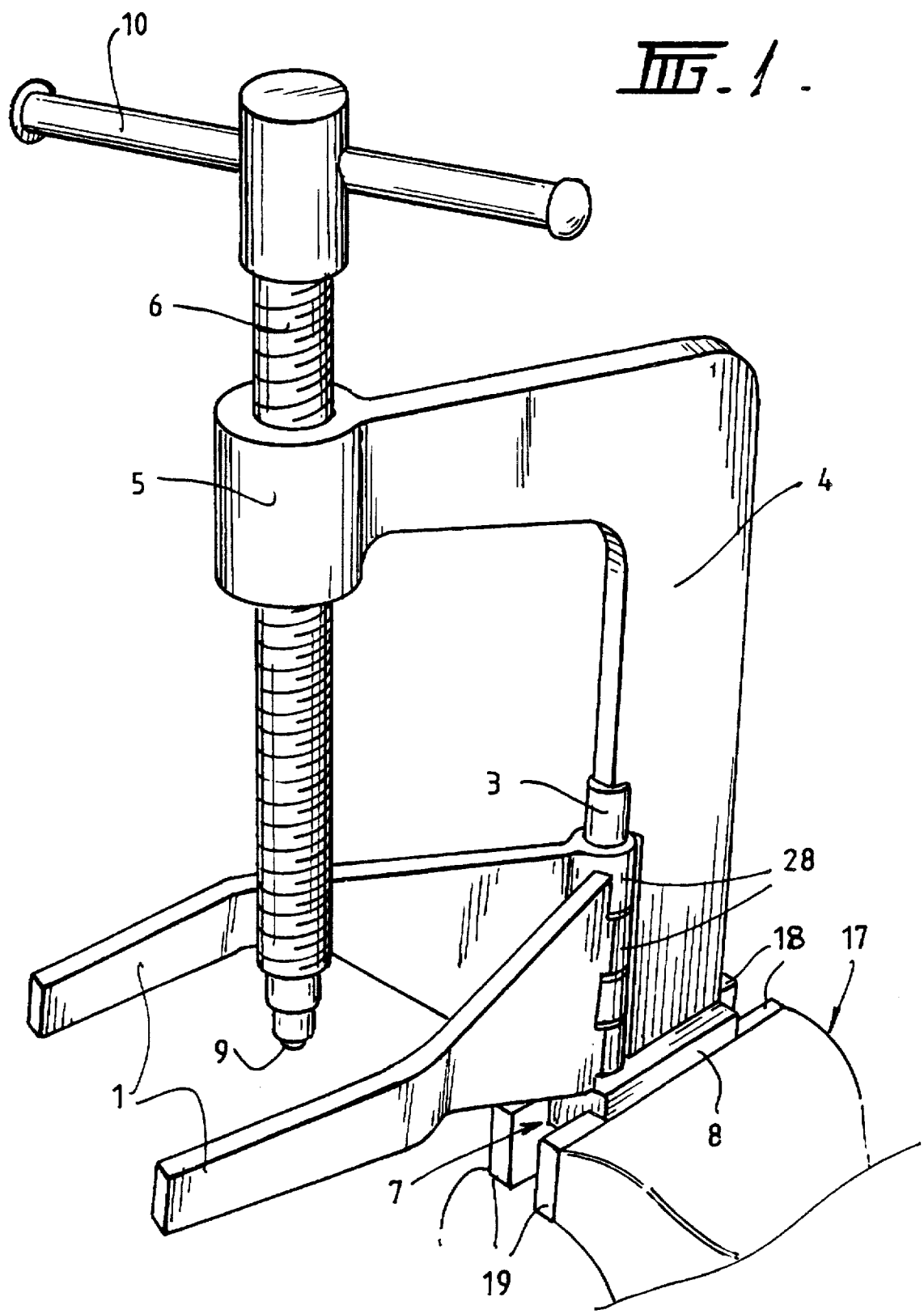

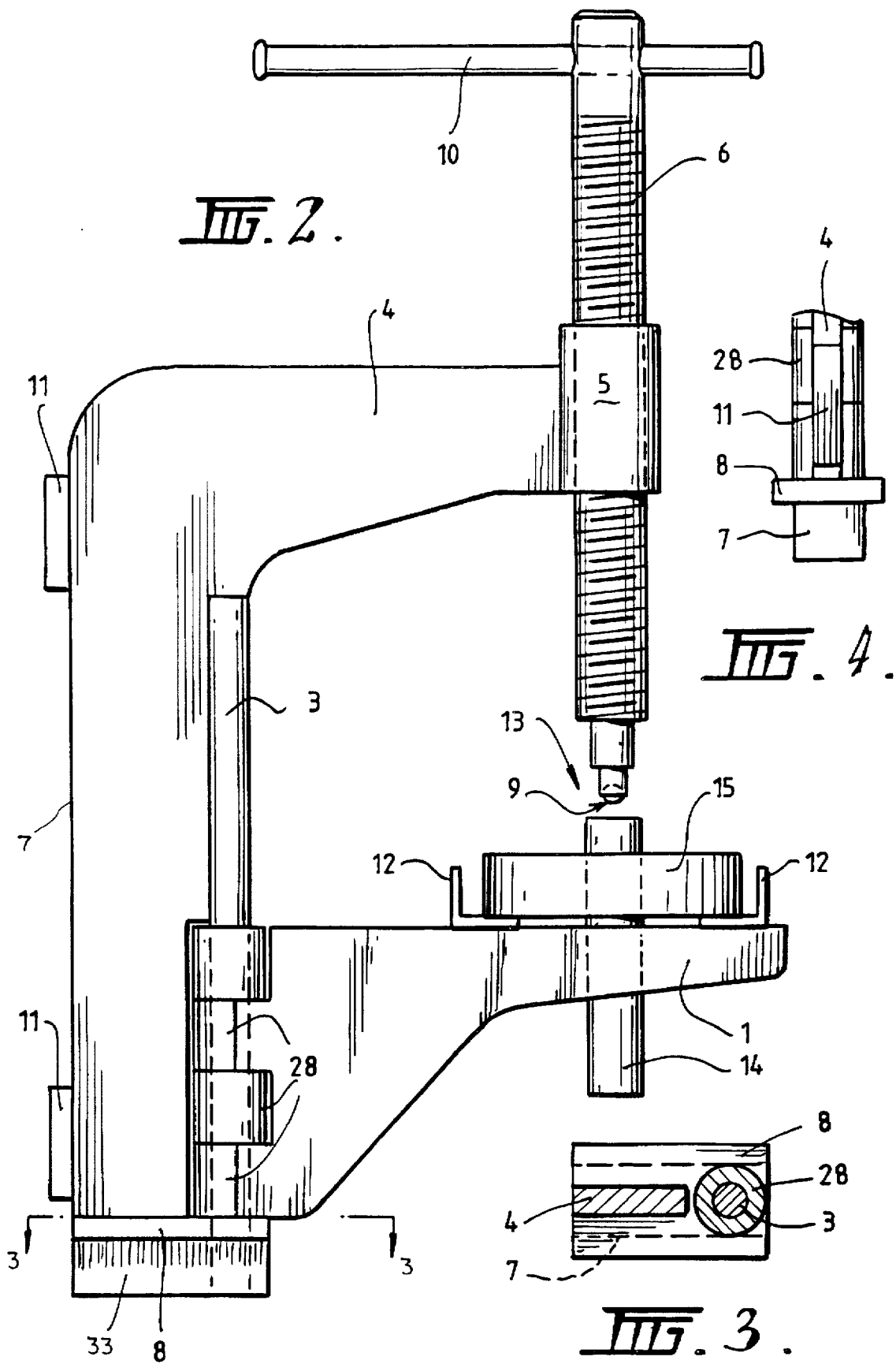

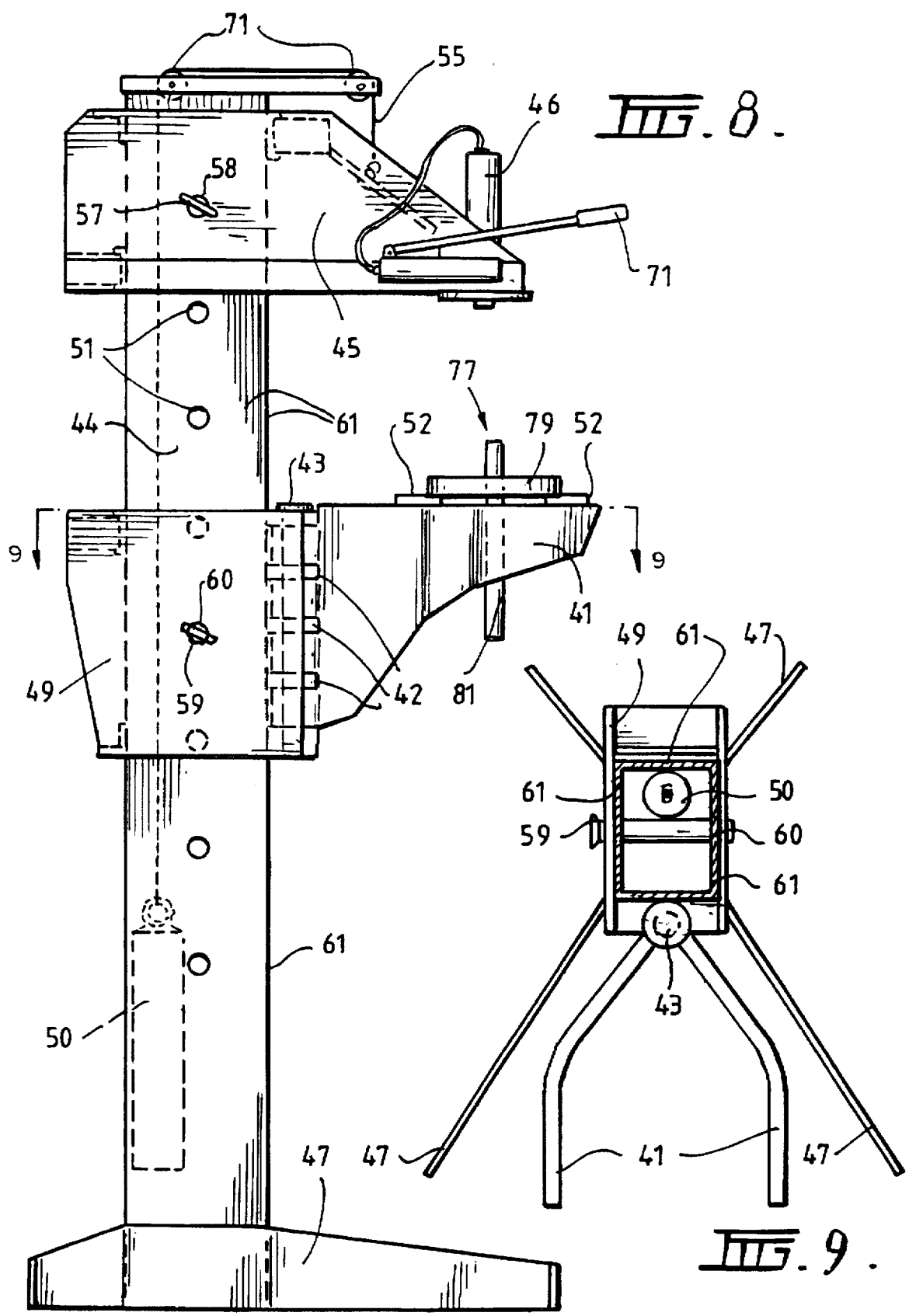

PORTABLE BEARING PRESS

BACKGROUND OF THE INVENTION

The present invention relates to a press (hereinafter referred to as a "bearing press") for press-fitting components, such as bearings, gears and pulleys, onto shafts or removing the components from shafts.

Conventional bearing presses comprise a support frame having a base section, two spaced-apart elongate side members extending upwards from the base section, and a fixed mounting member to which is connected a hydraulically operated pressure device. Attached to the elongate side members of the support frame by pins or bolts are two parallel support members which can be adjusted in height but usually not in width.

One disadvantage of conventional bearing presses is that the height of the support members is difficult to adjust, often requiring the use of a winch. As a consequence, often operators use spacers between an object to be worked on and the pressure device. Sometimes the spacers fly out of position under pressure and can cause serious injury or damage to property.

Furthermore, the support members are not easily adjustable in width and this limits the range of objects that can be placed on conventional bearing presses. Even when objects (for example, bearings mounted on shafts) are placed between the support members, invariably, an operator must place support plates across the top edges of the support members and underneath the bearing. It is often an unnecessary inconvenience to find appropriate support plates and place them in position.

Furthermore, objects that can be placed into the conventional bearing presses often must be placed between the support members from underneath and this can be difficult for an operator when objects are heavy.

Another disadvantage of conventional bearing presses is that they are too large to fit into a tool box and to be used as a portable tool.

As an alternative to conventional bearing presses, it is known to use bearing pullers to remove components, such as bearings, gears, and pulleys from shafts. However, there are often difficulties associated with bearing pullers.

Firstly, if a shaft from which a component is to be pulled is not centrally located in relation to that component the pressure device can slip off the end of the shaft under pressure or damage the component due to uneven leverage being applied by the jaws of the bearing puller.

Secondly, when using a bearing puller it is often necessary to hold the arms of the bearing puller with one hand while operating a rotating threaded pressure device with the other hand. The pressure which can be applied by the bearing puller is often limited to the counter force which can be applied to the puller arms by one hand.

Thirdly, it is often difficult to place the jaws of the arms of the bearing puller securely under the component to be pulled from a shaft due to a narrow clearance relative to the thickness of the jaws.

OBJECTS OF THE INVENTION

It is the object of the present invention to alleviate the disadvantages of conventional bearing presses and bearing pullers as described above.

According to the present invention there is provided a bearing press for assembling a component, such as a bearing, onto a shaft, or removing from a shaft, the bearing press comprising a support frame substantially L-shaped having a horizontal and a vertical leg, means for supporting an object in a horizontal position and means for applying downward pressure to a portion of the object.

It is preferred that the support means includes a pair of support arms pivotally mounted directly or indirectly to the support frame for movement sideways in opposite directions between a substantially closed position and an open position at which the component can be positioned so that the component rests on the support arms and the shaft extends downwardly between the support arms.

It is preferred particularly that the support arms be shaped to wrap at least partially around the shaft.

In one embodiment it is preferred that the support frame comprises a base section having a form to be received and retained in a vice.

In another embodiment it is preferred that the support frame comprises a base section adapted to support the press on a horizontal surface.

It is preferred that the press comprises a mounting means for mounting the pressure means to the support frame.

It is preferred that the mounting means be adapted to slide along the length of the support frame to adjust the vertical spacing between the pressure means and the support means.

It is preferred that the press comprises a mounting means for mounting the support means to the support frame.

It is preferred that the mounting means be adapted to slide along the length of the support frame to adjust the vertical spacing between the pressure means and the support means.

The present invention can be embodied in many ways without departing from the spirit and scope described above and there are two preferred embodiments of the invention which are referred to hereinafter as the "portable press" and the "pedestal press".

BRIEF DESCRIPTION OF THE DRAWINGS

FIG. 1 is a perspective view of a preferred embodiment of a portable press in accordance with the invention;

FIG. 2 is a side elevational view of the portable press shown in FIG. 1 with an object to be pressed positioned in an operative position;

FIG. 3 is a plan cross-sectional view along the line 3—3 in FIG. 2;

FIG. 4 is a rear elevational view of the base section of the portable press;

FIG. 8 is a side elevational view of a preferred embodiment of a pedestal press in accordance with the present invention; and FIG. 9 is a plan cross-sectional view along the line 9—9 of FIG. 8 with the support arms in an open position.

DETAILED DESCRIPTION OF THE INVENTION

Figure 5:
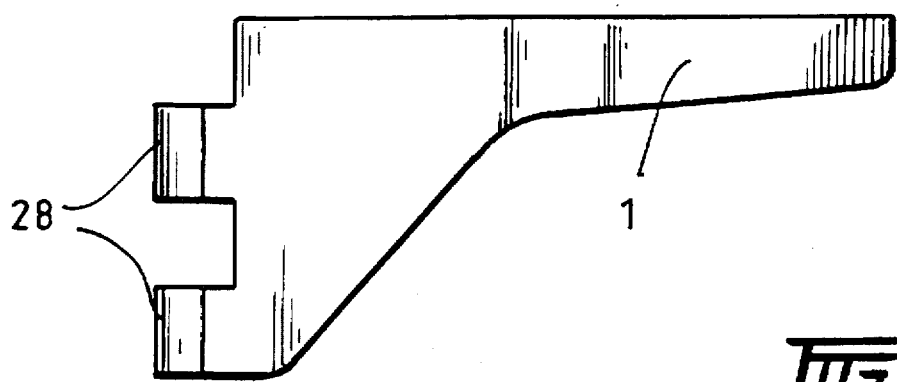
FIG. 5 is a side elevational view of the hinged support arms of the portable press.

The preferred embodiment of the portable press shown in FIGS. 1 to 7 is configured for working on an object, generally identified by the number 13 (FIG. 2), which comprises a component 15, such as a bearing, mounted on a shaft 14.

The portable bearing press comprises an L-shaped frame 4 having a horizontal and a vertical leg which terminates at a lower end in a base section 7 designed to be clamped securely in a vice 17 (FIG. 1); and at an upper end of the horizontal leg a threaded mounting 5 designed to receive a threaded shaft 6 or a hydraulic ram assembly (not shown) or any other suitable pressure device for applying pressure to the shaft 14 (FIG. 2).

On the rearward edge of the support frame 4 vertical leg there are two brackets 1 with holes (not shown) suitable to receive bolts to facilitate wall mounting of the portable press.

As can be seen in FIGS. 1 to 4, the base portion 7 of the support frame 4 is substantially T-shaped and includes a body portion in the form of a downwardly extending plate member 33, which in use is clamped between the jaws 19 of a vice 7 and further includes a pair of shoulders 8 which extend from opposite sides of the plate member 33 which are intended to rest against the upper faces 18 of the jaws 19.

The portable press further comprises two support arms 1 which are mounted to the support frame 4 so that the support arms 1 can pivot independently. The support arms 1 are mounted to the vertical leg of the support frame 4 by means of a removable pin 3 which is retained by the support frame 4 and extends through buses 28 at one end of each support arm 1. This arrangement enables the support arms 1 to be easily removed from the support frame 4, if necessary.

The portable press further comprises a slideable bar 10 extending through an opening in an upper end of a threaded shaft 6. The purpose of the slideable bar 10 is to enable hand-powered rotation of the threaded shaft 6 by an operator to adjust the height of the threaded shaft 6.

The threaded shaft 6 comprises a ball tipped end formed by a ball bearing 9 which is fitted into a socket (now shown) in the lower end of the shaft 6 so as to rotate in any direction relative to the shaft 6. As a consequence, the ball bearing 9 ensures that the rotating force of the shaft 6 is not transferred to the object 13 positioned on the portable bearing press—thus maximising the stability of the object 13 during a pressing or pulling operation.

As can best be sen in FIGS. 2, 6 and 7, the support arms 1 are shaped in a manner to wrap at least partially around the shaft 14 of the object 13 so that there is substantial and uniform contact between the underside of the component 15 and the support arms 1, and to located the shaft 14 of the object 13 centrally below the threaded shaft 6.

In use of the portable press, the press is secured firmly by the vice 17—as shown in FIG. 1. Then, the shaft 6 is rotated by hand force applied to the sliding bar 10 to move the ball lipped end of the shaft 6 away from the support arms 1 to provide sufficient clearance to position the object 13. When sufficient space has been provided, the support arms 1 are pivoted in opposite directions away from a closed position shown in FIG. 6 to a spaced-apart position shown in FIG. 5. The object 13 is then placed between the support arms 1, and the support arms 1 are then pivoted towards each other to contact the shaft 14 with the underside of the component 15 resting on the support arms 1. In this position, two support arms 1 and underneath the component 15 to provide further support for the component 15. The use of the plates 12 is desirable in situations when the shape of the object 13 is such that the support arms 1 cannot provide adequate support. Finally, after the object 13 is positioned and supported by the support arms 1, the threaded shaft 6 is rotated by hand force applied to the sliding bar 10 so that the ball bearing 9 on the shaft 6 moves downward and contacts the end of the shaft 14. As further downward pressure is applied, the shaft 14 is pushed through the centre of the component 15 until the desired press-fit or removal from the component 15, as the case may be, has been achieved.

The embodiment of the pedestal press shown in FIGS. 8 and 9 comprises an upright support frame 44 in the form of a rectangular-section tubular member having side walls 61 which is supported by a base section in the form of two forwardly and two rearwardly directed members 47.

The pedestal press further comprises a pressure device 46, hydraulically operated in this embodiment, mounted to the support frame 44 by a mounting assembly 45 and constructed to slide up and down the support frame 44 and be secured to the support frame 44 by a mounting pin 57 extending through aligned holes 58 in the mounting assembly 45 and aligned holes 51 in the sides 61 of the support frame 44 in a desired position.

The pedestal press further comprises a counter weight 50 positioned inside the tubular member which forms the support frame 44. The counter weight 50 is connected to the mounting assembly 45 by a cord or wire 55 via pulleys 71 mounted to the support frame 44 and is provided to make easier upward and downward movement of the mounting assembly 45.

The pedestal press further comprises two support arms 41 to support an object 77 which comprises a component 79, such as a bearing, mounted to a shaft 81. The support arms 41 are mounted to the support frame 44 by a mounting bracket 49 fixed in the desired position by a pin 59 which passes through aligned holes 60 in the mounting bracket 49 and aligned holes 51 in the support frame 44.

The support arms 41 are independently pivotally connected to the mounting bracket 49 by a removable pin 43 retained by the mounting bracket 49 and bushes 42 on one end of each support arm 41.

In use of the pedestal bearing press, the pressure device 46 and the support arms 41 are positioned relative to each other, for example, by moving the pressure device 46 by removing the pin 57, sliding the mounting assembly 45 upwards or downwards to a selected position at which there is alignment of the holes 58 of the mounting assembly 45 and the holes 51 in the support frame 44, and inserting the pin 57.

Alternatively, or in addition, the support arms 41 may be moved to a suitable position by removing the pin 59, sliding the mounting bracket 49 upwards or downwards to a selected position at which there is alignment of the holes 60 in the mounting bracket 49 and the holes 51 in the support frame 44, and inserting the pin 60.

Figure 6:
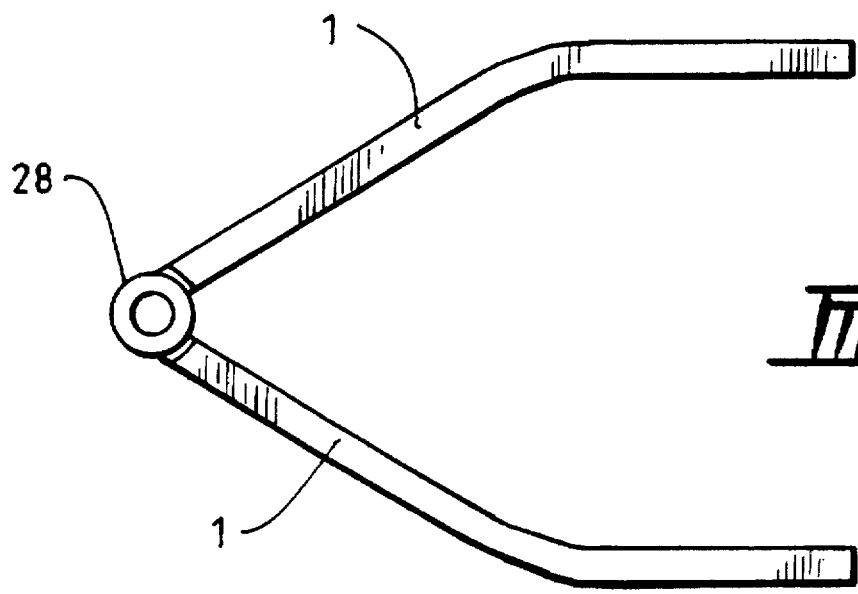
FIG. 6 is a plan view of the hinged support arms in the open position.
Figure 7:
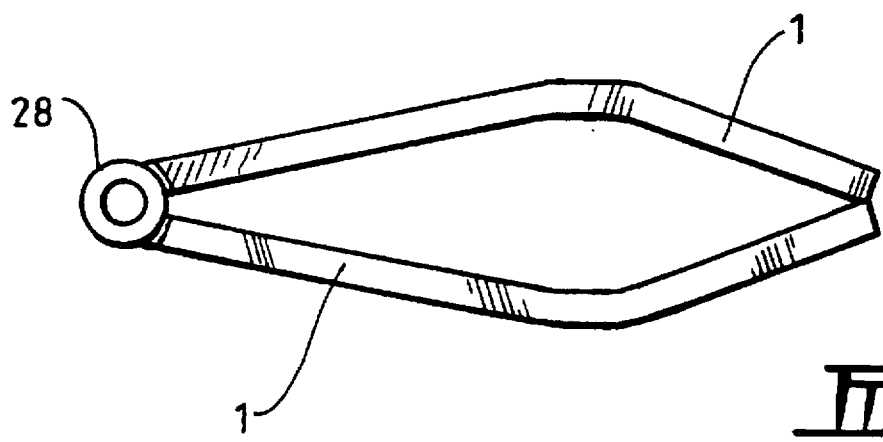
FIG. 7 is a plan view of the hinged support arms in the closed position.

After the support arms 41 and the pressure device 46 have been positioned as required, the support arms 41 are pivoted sideways in opposing directions to the spaced apart position as shown in FIG. 6. Then, the object 77 is positioned so that the component 79 rests on the support arms 41 and the shaft 81 extends through the gap between the support arms 41.

In this position, if required, two plates 52 may be placed across the top edges of the support arms 41 and underneath opposing sides of the component 79 of the object 43. In many cases, due to the special shape of the support arms 41 as sen in FIGS. 6 and 7 which give even support to the front and rear sections on both sides of the component 79, the support arms 41 will provide sufficient support for the component 79 without the need for support plates 52.

In any event, the object 77 is positioned by the support arms 41 with the centre of the shaft 81 directly underneath the centre of the pressure device 46. Then, the pressure device 56 is operated by a lever 71 to apply downwards pressure onto the shaft 81 until it has been pressed to the desired position or pulled from the object 77 as the case may be.

The above described portable press and pedestal press are not subject to the disadvantages of the conventional bearing presses and bearing pullers discussed in the introduction to the specification because of the following features.

(1) The use of support arms pivotally connected directly or indirectly to a support frame so that in use each arm can be moved sideways to allow an object to be placed in the press through the front opening created by the support arms. When the object has been placed between the support arms, the support arms can then be closed to wrap around the shaft of the object and to support the bearing or other component which is to be pressed on to or removed from the shaft.

(2) The use of a height adjustable mounting for a hydraulic or other suitable pressure device on the pedestal press so that in use height adjustment can be made quickly and easily by lowering or raising the pressure device above the object.

(3) The use of a base section on the portable press so that the press can be supported by a bench-mounted vice. This allows portability of the bearing press both in a workshop and in field service work.

In addition, the vice-mountable portable press allows the press to be firmly secured and the required pressure to be applied by use of a threaded shaft unlike a bearing puller with a threaded shaft pressure device where the whole puller must be prevented from rotating under pressure application by the operator.

Furthermore, by placing an object to be worked on so that the two support arms partially wrap around the shaft of the object and, optionally, by positioning plates across the tops of the support arms to support the bearings or other component mounted on the shaft, the bearing or other component can be pressed from the shaft, even in situations where the shaft is off-centre without pressure having to be applied at the extremities of the component, and this alleviates the danger of damage to the component, as often occurs in using a bearing puller.

Finally, by using plates underneath the bearing or other component, the bearing or other component can be removed from shaft even in situations where the clearance for placing the ends of puller arms is too narrow.

Many modifications may be made to the preferred embodiments of the bearing press described above without departing from the spirit and scope of the present invention.

I claim:

1. A portable press for press fitting a component onto a shaft or removing a component comprising:

an upright support frame having a base section to be received and retained in a vice, said base section being T-shaped and including a body section in the form of a downwardly extending plate member for clamping between opposed jaws of a vice, said body section including a shoulder section extending transversely to the plate member for resting against upper edges of the vice jaws;

a support means for supporting the component, the support means including a pair of support arms which are shaped to wrap at least partially around the shaft and which are pivotally mounted to the support frame for sideways movement in opposite directions between an open position for allowing the component to be placed on the press through a front opening created by said support arms and a closed position at which the support arms are wrapped at least partially around the shaft, the component being positioned so as to rest on the support arms, the shaft extending downward between the support arms, and means extending from the support frame for applying downward pressure to the shaft.

2. A portable press for press fitting a component onto a shaft or for removing the component from the shaft, comprising:

a substantially L-shaped support frame having an upper end with a threaded mounting, a base portion with an end including a shoulder portion extending from opposing sides, the base portion being T-shaped in cross-section and to form a downward extending plate for being clamped between opposing jaws of a vice, the shoulder portion extending transversely to the plate member for resting against upper edges of the vice jaws;

a support means for supporting the component, the support means consisting of a pair of support arms which are shaped to wrap partially around the shaft, said support arms being pivotally mounted to the support frame for sideways movement in opposite directions between an open position for allowing the component to be placed on the press through a front opening created by the support arms and a closed position at which the support arms are wrapped partially around the shaft, the component being positioned so as to rest on the support arms, the shaft extending between the support arms in a downward direction; and means for extending from the support frame for applying pressure to the shaft in the downward direction.

3. The portable press according to claim 2 wherein the means for applying pressure includes a threaded shaft rotatable with respect to the threaded mounting.

4. The portable press according to claim 3, wherein the threaded shaft includes a ball tipped end which operates to prevent rotation of the shaft to be inserted or removed from the component.

5. The portable press according to claim 4, wherein the component is a bearing.

6. The portable press according to claim 2, wherein a pair of brackets with holes are provided on a rearward edge of the support frame for wall mounting the press.

* * * * *